United States Patent [19]

Klein

[11] Patent Number: 4,729,300

[45] Date of Patent: Mar. 8, 1988

[54] PRESS CUSHION FOR A MECHANICAL PRESS

[75] Inventor: Theodor Klein, Burbach, Fed. Rep. of Germany

[73] Assignee: Fa. Theodor Grabener Pressensysteme GmbH & Co. KG, Netphen, Fed. Rep. of Germany

[21] Appl. No.: 903,594

[22] Filed: Sep. 3, 1986

[30] Foreign Application Priority Data

Sep. 4, 1985 [DE] Fed. Rep. of Germany ....... 3531526

[51] Int. Cl.⁴ .............................................. D30B 15/14
[52] U.S. Cl. ...................................... 100/43; 100/259; 100/281; 72/453.13; 267/119
[58] Field of Search ................... 100/43, 272, 281, 50, 100/259; 92/134; 60/413, 415; 72/453.13; 267/119

[56] References Cited

U.S. PATENT DOCUMENTS

| | | | |
|---|---|---|---|
| 3,926,033 | 12/1975 | Forichon | 100/272 X |
| 4,011,809 | 3/1977 | Waller et al. | 100/259 |
| 4,202,174 | 5/1980 | Grigonenko et al. | 60/413 |
| 4,481,768 | 11/1984 | Goshorn et al. | 60/415 X |

FOREIGN PATENT DOCUMENTS

| | | |
|---|---|---|
| 510810 | 5/1952 | Belgium . |
| 409075 | 1/1925 | Fed. Rep. of Germany . |
| 848596 | 7/1949 | Fed. Rep. of Germany . |
| 1502153 | 2/1969 | Fed. Rep. of Germany . |
| 1774674 | 1/1972 | Fed. Rep. of Germany . |
| 2059740 | 6/1972 | Fed. Rep. of Germany . |
| 2403532 | 8/1975 | Fed. Rep. of Germany . |
| 2003171 | 7/1976 | Fed. Rep. of Germany . |
| 2065816 | 4/1978 | Fed. Rep. of Germany . |
| 2732278 | 1/1979 | Fed. Rep. of Germany . |
| 2844792 | 4/1980 | Fed. Rep. of Germany . |
| 3411151 | 1/1985 | Fed. Rep. of Germany . |

*Primary Examiner*—Andrew M. Falik
*Attorney, Agent, or Firm*—Karl F. Ross; Herbert Dubno

[57] ABSTRACT

The mechanical press, particularly a toggle press, comprises a hydraulic member connected between the force transmitting and force receiving components, such as a toggle joint, carriage, anvil, and platen. The anvil is mounted on a hydraulic member which is located in a hydraulic chamber. The hydraulic member acts as a press cushion which is continuously connected with a large volume fluid reservoir which is maintained constantly under a gas pressure. The hydraulic member has a maximum filling volume which is at most 1% of the volume of the fluid reservoir.

10 Claims, 2 Drawing Figures

PRESS CUSHION FOR A MECHANICAL PRESS

FIELD OF THE INVENTION

My present invention relates to a mechanical press, particularly to a toggle press.

BACKGROUND OF THE INVENTION

In a known toggle press a hydraulic member is connected between the force transmitting and force receiving components, such as the toggle joint, carriage and platen of the press. A hydraulic chamber for the hydraulic member acts as a press cushion which is continuously connected with a fluid reservoir or accumulator which is maintained under gas pressure.

A mechanical press of this basic type is described in German Open Patent Application DE-OS No. 27 32 278 in which a hydraulic intermediate member is connected to the platen, plunger and connecting rod whose pressure during overload at the lower dead point can be relieved by opening a valve.

The valve in the hydraulic intermediate member controlling the pressure dependence is designed as an electrically controllable valve which is connected electrically by a control mechanism with at least one electrical sensor which is positioned so that it responds to a predetermined stress in one of the structural components under pressure.

Of course this structure for the press results in the force receiving and transmitting components having the same rigidity under both small and large pressing forces because the same pressure is maintained constantly in operation of the hydraulic system. However since the electrically controllable valve opens when a predetermined load has been exceeded and the working hydraulic fluid flows away from the hydraulic member not under pressure, the operating cycle of the press is interrupted and thus a jamming or an overload of the press at its lower dead point is counteracted.

In many cases, especially in operation of a calibrating or sizing press for a prefabricated material made in a sintering process, it is desirable or even required that it be subjected to a precisely preset pressing force, independent of differing height measurements of the article to be sized resulting from the prefabrication within certain limits.

The processing of the material in this calibrating process must be such that the so-called "spring back effect" is prevented or at least is kept within certain definite limits. The "spring back effect" can lead in an undesirable way to uncertainties and variations in the dimensions of the calibrated surfaces of the product from those dimensions preset in the calibrating device.

Essentially in this calibrating process the operating cycle of the press should run on while the pressing force is maintained at its full value when the initial measurements of the piece to be calibrated exceed those aimed at in the prefabrication process.

OBJECTS OF THE INVENTION

It is an object of my invention to provide an improved mechanical press, particularly a toggle press, which can obviate drawbacks of earlier toggle presses, especially those of the types described.

It is also an object of my invention to provide an improved mechanical press, particularly a toggle press, in which during the whole operating cycle the pressing force is maintained at a desired set value even when the material being processed has initial dimensions exceeding the predetermined set dimensions.

It is a further object of my invention to provide an improved mechanical press, particularly a toggle press, in which an exact definite response of the system is guaranteed for different operating conditions so that a jamming of the press at its lower dead point is prevented.

SUMMARY OF THE INVENTION

These objects and others which will become more readily apparent hereinafter are attained in accordance with my invention in a mechanical press, particularly a toggle press, comprising a hydraulic member connected between the force transmitting and force receiving components, such as a toggle joint, a carriage and a platen, whose hydraulic chamber acts as a press cushion which is continuously connected with a fluid reservoir which is maintained under a gas pressure.

According to my invention the press cushion of the hydraulic member has a maximum filling volume which is at most 1% of the volume of the fluid reservoir and the gas pressure in the fluid reservoir is maintained continuously at a value capable of providing a suitable pressing force.

In this way it is guaranteed that the predetermined pressing force in the entire operating cycle of the press is maintained even when the material or piece to be processed has initial dimensions which exceed their preset values.

Advantageously the operating pressure in the hydraulic member can be varied by a varying gas pressure in the fluid reservoir and because of that the pressing force within certain limits can be set with sensitivity.

A signal whose magnitude represents the fluid pressure in the hydraulic member can be fed to a computer and the associated gas pressure thus automatically determined by the fluid pressure in the fluid reservoir.

Also a plurality of pressure sensors for different operating pressures can be selectively connectable to the computer so that the associated gas pressure can be quickly and exactly set in the fluid reservoir.

The gas pressure in the fluid reservoir or accumulator can be varied in the gas chamber by a gas pump which is connected with a high pressure gas tank, e.g. a conventional gas "bottle."

An optimal operation of the press can be attained when the fluid reservoir is fed with working fluid by a gear pump and a piston pump. The gear pump is set up for changing the preset desired pressure and the piston pump is set up for maintaining the desired pressure.

The gas pump comprises a piston unit connectable temporarily with the high pressure gas tank in each of whose opposing end configurations a limit switch is operable, both of these limit switches being associated with a displacement valve by which the gear pump is temporarily connectable with one side of the piston unit for operation of the gas pump.

Finally it is also important according to the invention that the gas pump selectively be connectable either with the high pressure gas tank or the gas accumulator compartment of the fluid reservoir.

When a hydraulic member connected between the force receiving and transmitting components is used in a mechanical press as it is in the press, according to my invention, understandably it need not be a single component. In fact, a large number of similar components connected in parallel can be used as the hydraulic member.

It is important in the press according to German Open Patent Application DE-OS No. 27 32 278 to stop the undesirable response of the force receiving and transmitting components during the operating cycle of the press. One aim of my invention is to guarantee the precise and definite response of the system for different operating situations so that a jamming of the press at its dead point does not occur.

BRIEF DESCRIPTION OF THE DRAWING

The above and other objects, features and advantages of my invention will become more readily apparent from the following description, reference being made to the accompanying highly diagrammatic drawings in which.

SPECIFIC DESCRIPTION

Figure 1:
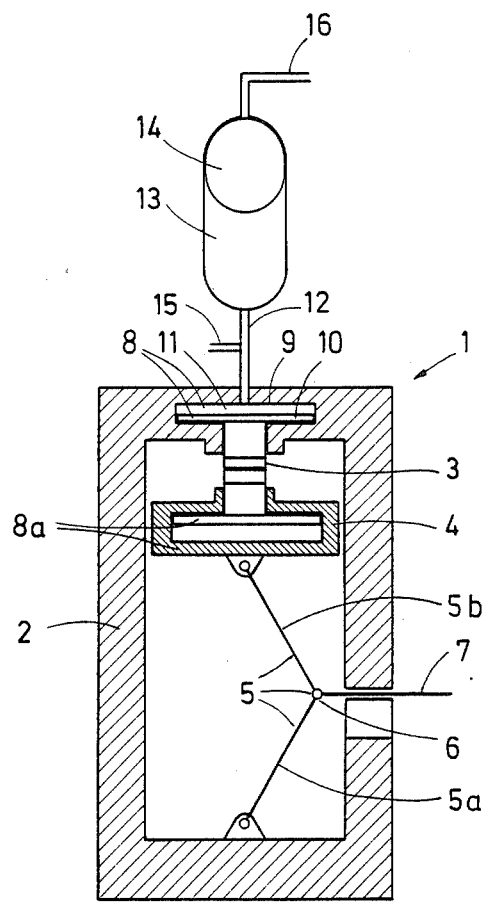
FIG. 1 is a simplified schematic cross sectional view of a toggle press with a press cushion between the components bearing the pressing force and the components transmitting the pressing force, in accordance with the invention.

The mechanical press 1 shown in FIG. 1 has a press frame 2 supporting a anvil 3, a platen 3a, a carriage 4 and toggle joint 5. The platen is supported in the carriage which is drivingly connected to the toggle joint.

The carriage 4 is moved in press frame 2 by a toggle joint 5 whose one member 5a acts on frame 2 and whose other member 5b acts on the carriage 4 while the press drive acts on its pivot joint which moves the toggle joint between its bent position and its extended position.

In press frame 2 a hydraulic member 8 is mounted which comprises a fixed cylinder or hydraulic chamber 9 and a plunger 10 guided slidably in it, the plunger 10 being the support for the anvil 3.

On its side facing away from the press platen 3 the plunger 10 of the hydraulic member 8 is acted on by a hydraulic cushion 11 which is located in cylinder or hydraulic chamber 9 and is connected by a high pressure pipe 12 permanently with a comparatively large capacity fluid reservoir or gas/liquid hydraulic accumulator 13.

A gas accumulator compartment 14 is provided in the fluid reservoir 13 which is under a gas pressure determined by the press force and because of that fluid contained in the fluid reservoir 13 of the high pressure pipe 12 and the cylinder 9 acts to permit development of a pressing force of sufficient magnitude to resist movement of the anvil 3.

The filled volume of the fluid reservoir 13 and also the gas accumulator compartment 14 in it is determined relative to the volume of the press cushion 11 between the plunger 10 and the cylinder 9 of the hydraulic member 8 when a maximum displacement of the plunger 10 occurs. Consequently, only an enlargement of volume available for the fluid in the fluid reservoir 13 can occur as opposed to the volume of the gas accumulator compartment 14 which corresponds to a pressure increase of less than 1% in the gas accumulator compartment 14.

The large volume fluid reservoir 13 can be connected by a pipe 15 to a fluid supply source while the gas accumulator compartment 14 is connectable by a high pressure pipe 16 with a high pressure gas source.

Figure 2:
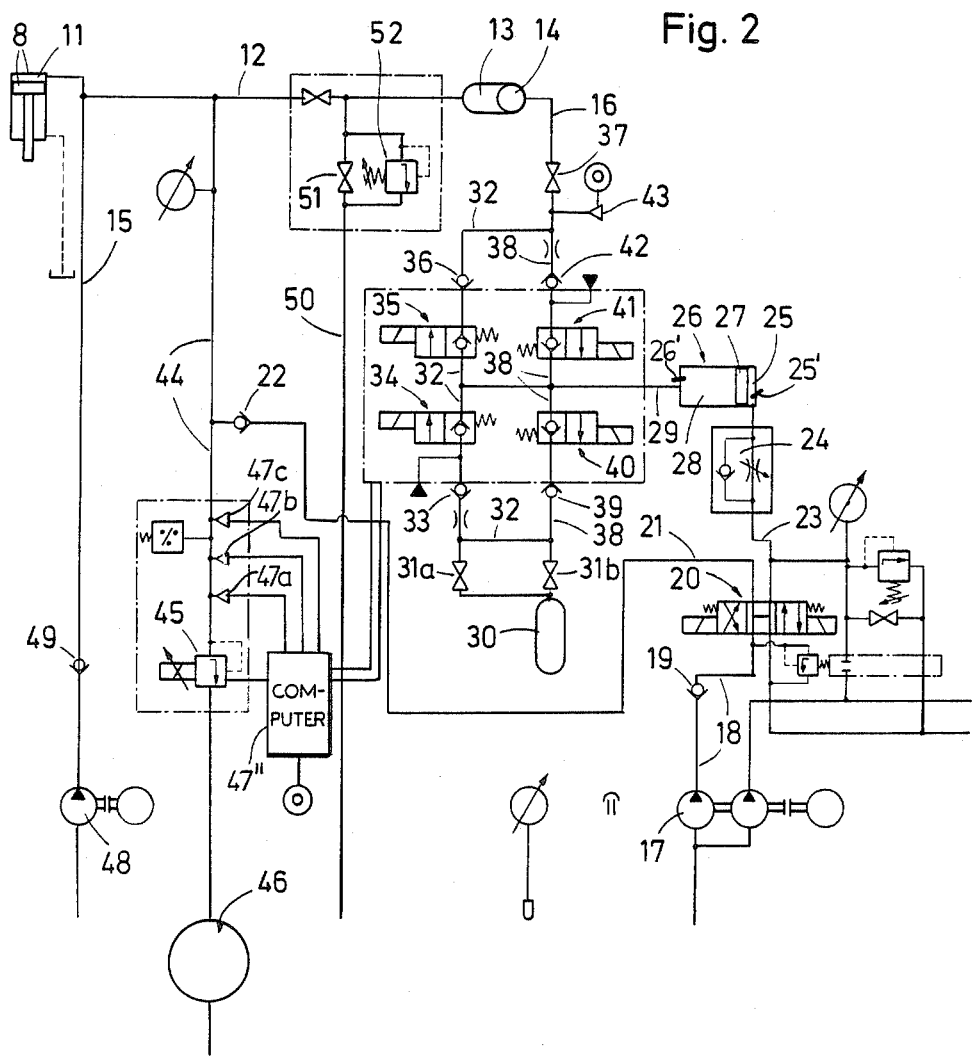
FIG. 2 is a schematic diagram of a system associated with the hydraulic member in the press of FIG. 1 for applying and holding constant its operating pressure.

The pressure generating and/or pressure maintaining system of the mechanical press 1 seen in FIG. 1 is shown in FIG. 2.

In this FIG. I have also illustrated the hydraulic members 8 including hydraulic chamber or cylinder 9, plunger 10 and press cushion 11 as well as the large volume fluid reservoir 13 with built in gas accumulator compartment 14.

The pressure generating and/or pressure maintaining system according to FIG. 2 is equipped with a gear pump 17 which for example has a pump capacity of about 10 liters/min and in whose high pressure connector pipe 18 a nonreturn valve or check valve 19 is provided.

The high pressure connector pipe 18 can be connected by a displacement valve 20 to a pipe 21 which feeds into the high pressure pipe 12 by a nonreturn valve or check valve 22. On the other hand it can also be connected by the displacement valve 20 to a pipe 23 which is connected by a nonreturn orifice valve 24 (having an adjustable throttle bridged by a check valve) to a cylindrical space 25 of a cylinder 26 in which a piston 27 operates.

On the other side of the piston 27, the piston 27 acts on an additional cylindrical space 28 of the cylinder 26.

Into the cylindrical space 28 of the cylinder 26 a pipe 29 opens through which nitrogen gas can be fed from a high pressure tank 30 into the cylindrical space 28. For this purpose the high pressure tank 30 is connected with a pipe 32 by by gate valves 31a and 31b.

This pipe 32 contains the nonreturn valve or checkvalve 33 in which two seat valves 34 and 35 are connected in series spaced from each other. Between both seat valves 34 and 35 the pipe 29 branches from the pipe 32 and is connected permanently with the cylindrical space 28.

Downstream of the seat valve 35, the pipe 32 contains a nonreturn valve 36 which has an operating direction corresponding to nonreturn valve 33.

Downstream of the nonreturn valve 36 the pipe 32 opens into the pipe 16 which is connected through a gate valve 37 with the gas accumulator compartment 14 inside of the fluid reservoir 13.

However, an additional pipe or tube 38 which contains a nonreturn valve or check valve 39 that opens in the opposite direction to nonreturn valve 33 in pipe 32 is connected with the gate valves 31a and 31b for the high pressure tank 30. Both seat valves 40 and 41 are connected in series to the nonreturn valve 39 between which the pipe 29 connects to the pipe 39 which is connected permanently open with the cylindrical space 28 of the cylinder 26.

A nonreturn valve or checkvalve 42 is provided in the pipe 38 downstream of the seat valve 41 which has an operating direction opposing that of the nonreturn valve 36 in the pipe 32.

The pipe 38 also opens into the pipe 16 downstream of the nonreturn valve 42 in which a pressure sensor 43 is provided downstream of the gate valve 37 which can respond to the gas pressure in the pipe 16 and/or in the gas accumulator compartment 14.

While it is possible to feed the gas accumulator compartment 14 in the fluid resevoir 13 and the cylindrical space 28 of the cylinder 26 simultaneously and one after the other with nitrogen gas through the pipe 32 by the seat valve 34 and 35 and at the same time to stop the return flow into the high pressure flask 30 by the nonreturn valves 33 and 36, the pipe 38 can be used with the seat valve 40 and 41 in order to feed the nitrogen gas back from the cylinder space 28 and the gas accumulator compartment 14 into the high pressure tank 30 while it is shut off in the opposite direction by the nonreturn valves 39 and 42 with the opened seat valves 40 and 41.

The pipe 21 is connected with a pipe 44 downstream of the nonreturn valve 22. Downstream of the connection between the pipe 21 and the pipe 44 a fluid reservoir 46 is connected to pipe 44 through a high pressure gas regulator 45 while on the other side of that connection the pipe 44 is connected to the pipe 12 which leads from the fluid reservoir 13 to the hydraulic member 8.

A plurality (advantageously here three) of pressure sensors 47a, 47b and 47c are connected to the pipe 44 between the high pressure regulator valve 45 and the conductor 12, each of which detects a different pressure valve and is connectable in a closed control loop with the pressure regulating valve 45.

The pressure of the fluid in the high pressure pipe 12 and understandably also in the fluid reservoir 13 and on the press cushion 11 of the hydraulic member 8 is held constant to a predetermined value according to the operative high pressure sensors 47a, 47b or 47c.

Not only the pipe 15 acted on by a piston pump 48 and a nonreturn valve 49 but also a pipe 50 is connected with the pipe 12 parallel to the pipe 44.

A gate valve 51 is connected in the pipe 50 with a relief valve 52 shunting it which responds when the highest fluid pressure set in the high pressure regulating valve 45 is exceeded by about 10%.

For example when the highest pressure of the pressure regulating valve 45 is set at 255 bar, then the relief valve 52 also is set approximately at a pressure of 280 bar.

While the high pressure pipe 18 for the geared pump 17 can be connected in a different way to the pipes 21 and 23 by the displacement valve 20 and the fluid fed to the fluid reservoir 46 by a different path, the piston pump 48 is only in a position to feed fluid from the fluid reservoir 46 into the pipe 12 between the fluid reservoir 13 and the press cushion 11 by the pipes 15. It is guaranteed that the fluid can be made available continuously in the high pressure transfer and/or high pressure maintaining system between the fluid reservoir 13, the high pressure pipe 12 and the press cushion 11, which guarantees the proper operation of the press 1.

The pressure sensor 43, which is connected upstream of the gate valve 37 to the gas pipe 16 near the gas accumulator compartment 14, responds to each gas pressure in the pipe 16, that is, it registers the gas pressure. In contrast the pressure sensors 47a, 47b and 47c in the fluid pipe 44 respond only to the total initial fluid pressure.

The pressure sensor 43 and the operative one of the pressure sensors 47a, 47b and 47c act on a computer 47″ which is of course designed so that the gas pressure in the pipe 16 associated with fluid pressure in the pipe 44 is automatically maintained with the highest possible accuracy.

On the piston 27 of the cylinder 26 both on the downstream end of the fluid space 25 and at the opposing end of the gas space 28 a limit switch 25′ or 26′ is provided so that both limit switches influence the flow channeling configuration of the displacement valve 20. In the basic configuration of the displacement valve 20, when the smaller of both limit switches is operated, the gear pump 17 is connected with the pipes 21 and also with the pipe 23.

The limit switch 25′ provided in the fluid space 25 of the cylinder 26 activates valve 20 from its resting position in such a way that the pipe 21 is separated from the gear pump 17 and is connected only with the pipe 23. When the limit switch 26′ on the gas side of the cylinder 26 is operated in contrast then the displacement valve 20 is connected at its middle position so that the gear pump 17 only feeds the pipe 21 while the pipe 23 can feed the fluid back into the fluid reservoir 46.

The operation of the pressure generating and maintaining system according to FIG. 2 for the mechanical press according to FIG. 1 is as follows:

To start up the system the fluid, for example hydraulic oil, fills the system so that it reaches all the fluid containing portions of the system.

Then pressurizing gas from the high pressure tank, for example nitrogen, is introduced to all gas containing portions of the system while the high pressure sensor 47b corresponding to the middle pressure value setting of the fluid is connected by a selector switch with the high pressure valve 45 in a closed control loop.

The gas pressure in the gas containing portions of the system is adjusted by opening seat valves 34 and 35 to a value which is between 60 and 66% of the pressure value which the operating pressure sensor 47b maintains in the fluid containing portions of the system.

The pressure for the fluid is set, for example in the range between 25 and 255 bar which corresponds to a press force of 18 to 180 Mp for mechanical press 1 by a selector switch of an electronic control unit. After switching in the electronic control the computer 47″ reads continuously the, for example three positioned, selector switch for the hydraulic pressure and calculates the associated gas pressure. The multiplier for calculation of the gas pressure is adjustable digitally by a DIL-switch in the range between for example 0.01 and 2.55.

Corresponding to the digitally selected hydraulic pressure, one of the three pressure sensors 47a, 47b and 47c is selected and is connected in a pressure control loop with the regulating valve 45.

As soon as the starting signal is issued by the press control the momentary gas pressure in the gas accumulator compartment 14 is fed into the computer by the pressure sensor 43 and compared with the calculated desired gas pressure.

When the desired pressure must be changed, the computer takes control of the gas pump which is formed by the gas portion 28 and the piston 27 in the cylinder 26. This gas pump 26, 27, and 28 is operable by the displacement valve 20 and the gear pump 17, that is, the computer can influence the fluid feed into the fluid portion 25 of the cylinder 26 by the valve 20 in order to shift the piston 27 and change the volume of the gas portion 28.

After pumping by the gas pump the actual gas pressure is read into the computer 47″ again from the pressure sensor 43. The filling and/or emptying of the gas accumulator compartment 14 in the fluid reservoir 13 is ended when the desired pressure is reached.

After attaining this desired pressure all seat valves 34, 35 and/or 40, 41 are closed and subsequently the high pressure valve 45 is adjusted to the desired hydraulic pressure.

As the high pressure valve 45 is set then the fluid reservoir 13 is filled up while the computer observes the hydraulic pressure and then sends a disabling signal to the control when the desired hydraulic pressure has been reached. The valve 20 is adjusted by the computer so that the piston pump 48 feeds the pressure making and/or maintaining system by the pipe 15 and of course with a precisely defined fluid flow rate of, for example, 1.1 l/min.

Based on the fact that the high pressure regulating valve 45 operates in a closed control loop with the operative pressure sensor 47a or 47b or 47c the hydraulic pressure is maintained very constant in the fluid reservoir 13.

In case a different fluid pressure is desired it is set in the selector switch already during operation of the press. Then with a subsequent operation of the starting sensor for the press operation the new value is taken into the system and the appropriate filling and/or emptying process for the gas accumulator compartment 14 initiated.

Next the pressure regulating valve 45 is brought to zero in order to empty the fluid reservoir until it is under a residual pressure of 20 bar. Then in this condition of the fluid reservoir 13 the actual gas pressure is read in by the pressure sensor 43.

For filling the gas accumulator compartment 14 with nitrogen gas, the seat valves 34 and 35 are opened whereby the gas pressure from the high pressure tank 30 in the gas portion 28 of the cylinder forces the piston 27 to the right end position.

Now the valve 20 is so controlled that fluid from the gear pump 17 is forced into the fluid portion 25 of the cylinder 26. Thus the piston 27 travels to the left and forces the nitrogen in the gas portion 28 through the opened seat valve 35 into the gas accumulator compartment 14 of the fluid reservoir 13. Also when the piston 27 reaches its left end position in the gas portion 28 the limit switch 26' is operated which operates the valve 20 so that the piston 27 is turned back again to the right end position under the gas pressure from the tank 30 acting in the gas portion, while the fluid runs back through the orifice portion of the nonreturn orifice valve 24 and the pipe 23 into the fluid reservoir 46.

The pump process of the gas pump repeats until the gas pressure in the gas accumulator compartment 14 climbs to about 75% of the selected gas pressure. This gas pressure is then read from the pressure sensor 43 into the computer 47''.

When the gas accumulator compartment 14 should be emptied because a lower desired value is selected, the seat valves 40 and 41 are connected. The working process of the gas pump is the same; however, the nitrogen is forced back into the high pressure tank 30.

During the operation of the mechanical press 1 the fluid can be taken from the press cushion 11 of the hydraulic member 8 when the preset desired hydraulic pressure is exceeded. In this instance, the fluid is forced back into the fluid reservoir 13 pressurized by the gas accumulator compartment 14 by the pipe 12 and the piston 10 can slide against the desired hydraulic pressure in the cylinder 9 of the hydraulic member 8.

The volume of the fluid reservoir 13 is such, compared to the maximum volume of the press cushion 11 in the hydraulic member 8, that the hydraulic pressure in the system in comparison to the predetermined desired pressure changes about 1% by back flow of the fluid into the fluid reservoir 13 during the running of the mechanical press through its dead point.

The special feature of the illustrated pressure generating and/or maintaining system is that press cushion 11 in the hydraulic member 8 acts as a hydraulic spring because it is not switched off but only yields to a predetermined gas pressure, when during an operating cycle of the press a higher pressure than the pressure set at the hydraulic member 8 occurs.

In FIG. 1 of the drawing the carriage 4 of the mechanical press 1 can be equipped if necessary with a hydraulic member 8a.

A mechanical press 1 can have either the hydraulic member 8 or the hydraulic member 8a. It can however also be equipped with both hydraulic members 8 and 8a (see FIG. 2).

This press cushion 11 is continuously connected with a comparatively large volume fluid reservoir 13. The fluid reservoir 13 is maintained under a gas pressure determining the press force. The press cushion 11 has the effect of a hydraulic spring which is not shut off but only yields when during the operating cycle of the press a higher than the preset pressing force occurs.

We claim:

1. In a mechanical press having a platen comprising a force transmitting component including a toggle joint and an anvil comprising a force receiving component wherein the anvil is mounted on a hydraulic member in a hydraulic chamber and wherein the hydraulic chamber acts as a press cushion for said anvil and which is continuously connected with a fluid reservoir which is maintained under a gas pressure, the improvement wherein said hydraulic member has a maximum filling volume which is at most 1% of the volume of said fluid reservoir and said gas pressure in said fluid reservoir is maintained continuously at a valve enabling development of a pressing force between the anvil and platen.

2. The improvement according to claim 1 wherein an operating pressure on said hydraulic member is changeable by a means comprising said gas pressure in said fluid reservoir.

3. The improvement according to claim 2 wherein the operating pressure on said hydraulic member generates a pressure value signal which is fed into a computer which compares said pressure value with a calculated desired gas pressure value and when said gas pressure value must be changed, the computer operates a means which changes a volume of said gas pressure.

4. A mechanical press comprising:
a platen comprising a force transmitting component including a toggle joint and an anvil comprising a force receiving component wherein the anvil is mounted on a hydraulic member in a hydraulic chamber acting as a press cushion for said anvil;
a fluid reservoir which is continuously connected to said hydraulic member and which is maintained under a gas pressure, said hydraulic member having a maximum filling volume which is at most 1% of the volume of said fluid reservoir;
a gas accumulator compartment in said fluid reservoir in which said gas pressure is maintained continuously at a value enabling development of a pressing force between the anvil and platen;
a gas pump connected to said gas accumulator compartment for changing said gas pressure;
a gear pump and a piston pump for feeding hydraulic fluid to said fluid reservoir, said gear pump being set up for providing changes in a set value of fluid pressure and said piston pump being set up for feeding said hydraulic fluid to maintain said set value of fluid pressure, a gas conduit communicating with said gas pump being selectively connectable either with a high pressure gas tank or said gas accumulator compartment of said fluid reservoir;

a plurality of pressure sensors for said fluid pressure and said gas pressure; and a computer which is connected to and receives the measurements of said pressure sensors and controls a means which regulates said gas pressure so that said fluid pressure and correspondingly said pressing force can be maintained under a variety of operating conditions.

5. In a mechanical press having a platen comprising a force transmitting component including a toggle joint and an anvil comprising a force receiving component wherein the anvil is mounted on a hydraulic member in a hydraulic chamber and wherein the hydraulic chamber acts as a press cushion for said anvil which is continuously connected with a fluid reservoir which is maintained under a gas pressure, the improvement wherein said hydraulic member has a maximum filling volume which is at most 1% of the volume of said fluid reservoir and said gas pressure in said fluid reservoir is maintained continuously at a value enabling development of a pressing force between the anvil and platen, and wherein an operating pressure of said hydraulic member is changeable by a means comprising said gas pressure in said fluid reservoir, and said operating pressure on said hydraulic member generates a pressure value signal which is fed into a computer which compares said pressure value with a calculated desired gas pressure value and when said gas pressure value must be changed, the computer operates a means which changes a volume of said gas pressure.

6. The improvement according to claim 5 wherein a plurality of pressure sensors for different operating pressures are associated with said hydraulic member and are connectable selectively to said computer.

7. The improvement according to claim 6 wherein said gas pressure arises in a gas accumulator compartment in said fluid reservoir and is changable by a gas pump which is connected to a high pressure gas tank.

8. The improvement according to claim 7 wherein a means for controlling the flow of a hydraulic fluid is connected to said fluid reservoir and comprises a gear pump and a piston pump, said gear pump being set up for providing changes in a set value of said fluid pressure and said piston pump being set up for feeding said fluid to maintain said set value of said fluid pressure.

9. The improvement according to claim 8 wherein said gas pump comprises a unidirectional piston unit connectable temporarily with said high pressure gas tank in each of whose opposing end configurations a limit switch is operable, both said limit switches being associated with a displacement valve.

10. The improvement according to claim 9 wherein a gas conduit communicating with said gas pump is selectively connectable either with said high pressure gas tank or said gas accumulator compartment of said fluid reservoir.

* * * * *